United States Patent
Rogers

(10) Patent No.: US 11,691,476 B2
(45) Date of Patent: Jul. 4, 2023

(54) ACTIVE VEHICLE VENTILATION CONTROL

(71) Applicant: KARMA AUTOMOIIVE LLC, Irvine, CA (US)

(72) Inventor: Brett Joseph Rogers, Tustin, CA (US)

(73) Assignee: Karma Automotive LLC, Irvine, CA (US)

( * ) Notice: Subject to any disclaimer, the term of this patent is extended or adjusted under 35 U.S.C. 154(b) by 572 days.

(21) Appl. No.: 16/523,595

(22) Filed: Jul. 26, 2019

(65) Prior Publication Data
US 2021/0023910 A1    Jan. 28, 2021

(51) Int. Cl.
*B60H 1/00* (2006.01)

(52) U.S. Cl.
CPC ..... *B60H 1/00842* (2013.01); *B60H 1/00742* (2013.01); *B60H 1/00764* (2013.01); *B60H 1/00771* (2013.01)

(58) Field of Classification Search
CPC ............ B60H 1/00764; B60H 1/00771; B60H 1/00807; B60H 1/00742; B60H 1/00407; B60H 1/00964; B60H 1/00842
See application file for complete search history.

(56) References Cited

U.S. PATENT DOCUMENTS

| | | | |
|---|---|---|---|
| 9,747,795 B1 * | 8/2017 | Espinosa | G08B 15/00 |
| 2007/0210737 A1 * | 9/2007 | Brander | E05F 15/71 318/483 |
| 2015/0041113 A1 * | 2/2015 | Enke | B60H 1/00421 165/202 |
| 2015/0061828 A1 * | 3/2015 | Fischer | G07C 9/00309 340/5.61 |

FOREIGN PATENT DOCUMENTS

| | | | | |
|---|---|---|---|---|
| DE | 202006000676 U1 * | 5/2006 | | B60H 1/24 |
| JP | 2007237789 | * | 9/2007 | |
| JP | 2016117327 A | * | 6/2016 | | B60H 1/00 |

OTHER PUBLICATIONS

RD661041, May 2019, RD.*

* cited by examiner

*Primary Examiner* — Steven S Anderson, II
(74) *Attorney, Agent, or Firm* — Honigman LLP

(57) ABSTRACT

A vehicle with an active climate control system. The vehicle having sensors that communicate with the active climate control system. The active climate control system controlling climate control elements upon evaluation of the sensor data. The active climate control fully customizable by the user of the vehicle.

16 Claims, 3 Drawing Sheets

ACTIVE VEHICLE VENTILATION CONTROL

The present disclose relates generally to the field of climate control for a vehicle. More specifically, this disclosure relates to the control system and algorithm of controlling temperature in a vehicle.

As described further herein, the control algorithm described and shown in the figures of the present application provides a safe and easy system for drivers to keep the interior of the vehicle at a desired temperature, and to protect the interior vehicle and personal items from temperature damage and degradation. The system also deters unwanted access and weather intrusion into the vehicle.

The interior of a vehicle can quickly reach high temperatures when exposed to sunlight and high ambient temperatures. Current conventional climate control is limited to preconditioning programs. Drivers can further aid in the conditioning of the vehicle by choosing a cooler location to park, or to roll down the windows. However, choice of parking can be limited, windows or moon/sun roof exposes the potential for theft and weather intrusion into the interior, and preconditioning, while effective, is also energy intensive.

There is a desire for a safe and easy method to provide climate control for a vehicle, which protects the vehicle interior such as upholstery and also any personal items that are sensitive to heat stored inside the vehicle.

With advancements in vehicle electronics such as sensors and control systems, there is room for improvement in the field of climate control. Climate control elements may include any passenger compartment retractable glass apertures such as windows, moon/sun roofs, rear windows. Climate control elements may also include HVAC system of the vehicle, and any apertures that may be actuated to allow fluid communication with the outside environment. The apertures may be located anywhere on the vehicle such as the HVAC line, including within the HVAC system, to allow communication with the outside environment. Windows, roofs and/or any apertures in a vehicle may generally be opened to allow heat transfer to occur. Outdoor and interior temperature sensors of the vehicle may be used to aid in climate control of the vehicle. The climate control elements of the vehicle can communicate with the outdoor and interior temperature sensors to allow improvement in climate control. Further control can be executed using data from rain sensors, dust sensors, driving assistance sensors (e.g. cameras, radar, ultrasonic, LIDAR), or wireless connection such as satellite, or radio. The climate control may also utilize an internet connection to receive information regarding the current or future environment of the vehicle. By using the described methods for climate control, the vehicle can reduce interior temperatures efficiently by improving time and energy required to the ideal temperature desired.

BRIEF DESCRIPTION OF THE DRAWINGS

The features, aspects, and advantages of the present invention will become apparent from the following description, and the accompanying exemplary embodiments shown in the drawings, which are briefly described below.

DETAILED DESCRIPTION

Figure 1:
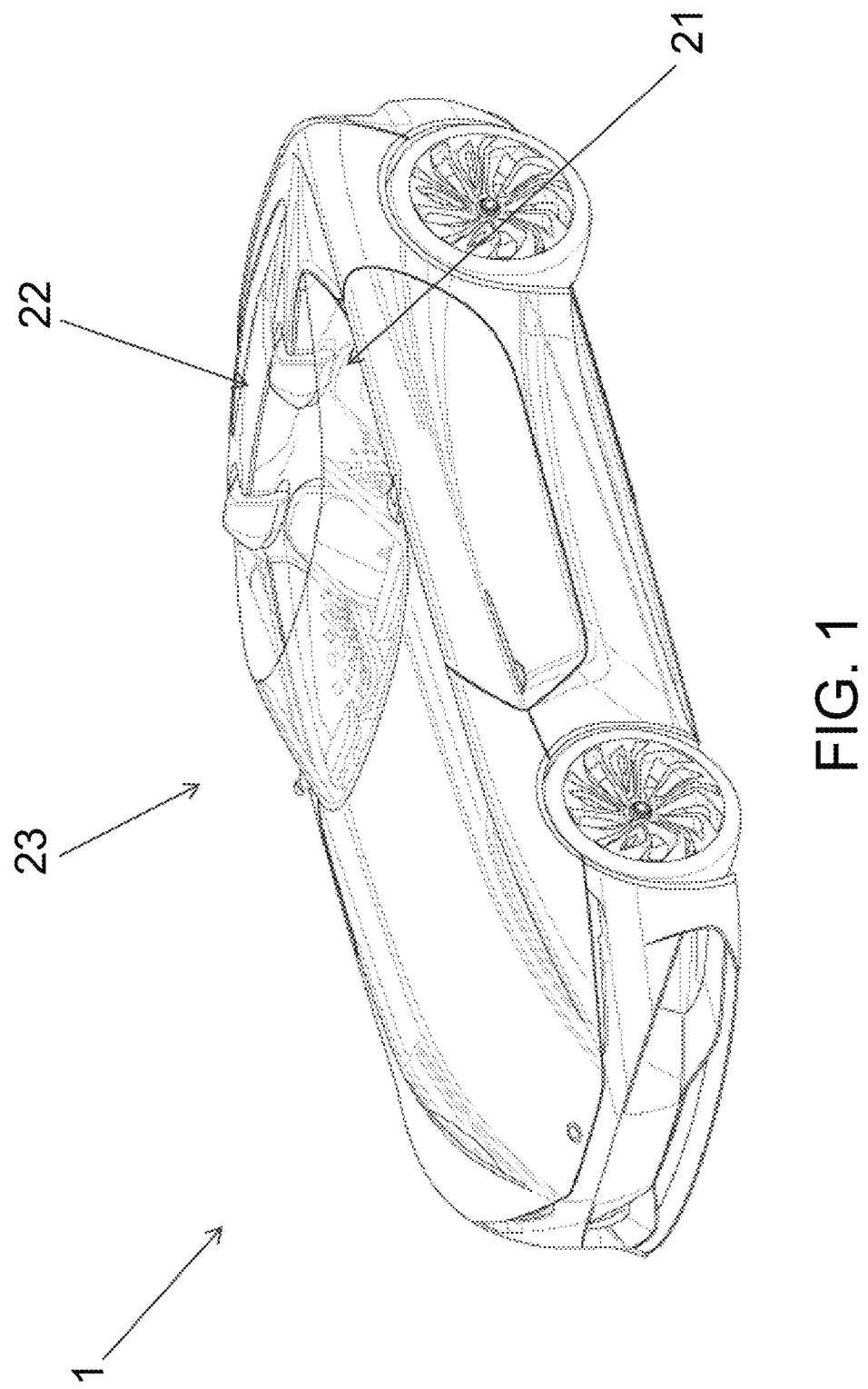
FIG. 1 is a vehicle with an exemplary active climate control system.

According to one embodiment of the disclosure, the controller of the control system checks whether the user has set active climate control on or off. If the active climate control status is on, the active climate control system will check for a mode. Various different modes can be set by the user for the active climate control system. The user may use a timed mode, where the active climate control system is on for a period of time, or a time set mode, where the climate control will be turned on at a certain time specified by the user. The user may also set the active climate control system to the continuously on status. During the continuous status, the active climate control runs until the interior temperature has reached the desired temperature. The desired temperature may be set by the user or recommended by the control system. Climate control elements may include windows, moon/sun roofs, HVAC system of the vehicle, and any apertures that allow communication with the outside environment. If the desired temperature is lower than the outside temperature, then the user can also set whether air conditioning will be used. The system will operate the climate control until the desired temperature is reached. If the air conditioning is turned on, then the control system will close the climate control element(s) to allow efficient energy use of the air conditioning. In a heating mode, the climate control element(s) of the vehicle will only open if the outside temperature is higher than the interior temperature. Similar to the cooling mode, if heating is activated, the climate control element(s) will close to allow efficient energy use of the HVAC. When the HVAC is off, if the interior temperature during the heating mode is lower than the outside temperature, then the climate control elements(s) will open to aid in the heating of the interior. Once the vehicle has reached the desired temperature, the climate control will attempt to maintain the temperature if the user allows the use of the HVAC. The active climate control system described allows for efficient cooling and heating of the vehicle. Herein described, an open climate control element can mean partially open or entirely open. The user may control how much the climate control element opens through the user settings of the active climate control.

In addition to active climate control, other inputs from the vehicle driving assistance sensors may be used to actuate the climate control elements of the vehicle. In an exemplary embodiment a driving assistance sensor communicates with the control system of the climate control. The driving assistance sensor monitors local movement around the vehicle and transmit data to the control system to control the climate control element(s) accordingly. The control system, in response to the movement registration by the driving assistance sensor, may control the window or roof to close upon registration of movement around the vehicle while keeping smaller apertures open. In this scenario, the controller may also not close the windows completely, allowing a small crack in the window to allow fluid communication with the outside air. The movement registration may include methods to send data to the controller only when a person is approaching the vehicle.

Further control system inputs can also include utilizing the rain sensor of the vehicle and weather data input. The active climate control system may monitor data from the rain sensor for current rain conditions. Any presence of rain would close the climate control element(s) of the vehicle.

Rain would send a confirmation from the rain sensor to the active climate control system and send a signal to the climate control element actuators to close. The active climate control system may also receive input from a weather data source via a wireless internet signal. Weather forecast data may be sent to a data receiver and then sent to the active climate control system for processing to determine whether the climate control elements of the vehicle should be open or closed. For example, if rain is predicted, then the controller will close the windows and roof. The controller may also keep other apertures open, such as apertures in the HVAC that cannot allow rain from entering, while keeping fluid and thermal communication to the outside air. Other forecast data such as pollen or pollution forecasts may be utilized as inputs for the active climate control system of the vehicle. The rain sensor may also be used as a particulate sensor. A particulate sensor may also be utilized to prevent particulates from entering the vehicle. The particulate sensor will send data to the control system to close the climate control elements and close the HVAC to outside air by enabling recirculation and enabling the cooling or heating of the vehicle. The particulate sensor is useful in detecting low quality air such as pollution. Particulate sensors may also detect allergens such as pollen or dust and other particulates which could affect the driver.

Any of the sensors described above trigger the controller to actuate climate control elements when certain data is read by the active climate control system. The user may set the conditions in which the controller actuates the climate control elements.

FIG. 1 shows an exemplary vehicle containing an active climate control system. The active climate control system may control actuation of the windows 21, roof 22 (shown retracted), HVAC 23 (inside the car), and other apertures in communication with the outside air (not shown). The roof shown is of a convertible top, however the roof of the vehicle could also be of a moon roof or a sun roof. The vehicle shown is preferred to be an electric vehicle. Conventional internal combustion engine may be utilized but may be restricted in the features and time allotted to provide power to the active climate control while the vehicle is idle, however electric vehicles contain large enough batteries to power the active climate control when idle. The electric vehicle may be hybrid or a fully electric vehicle.

Figure 2:
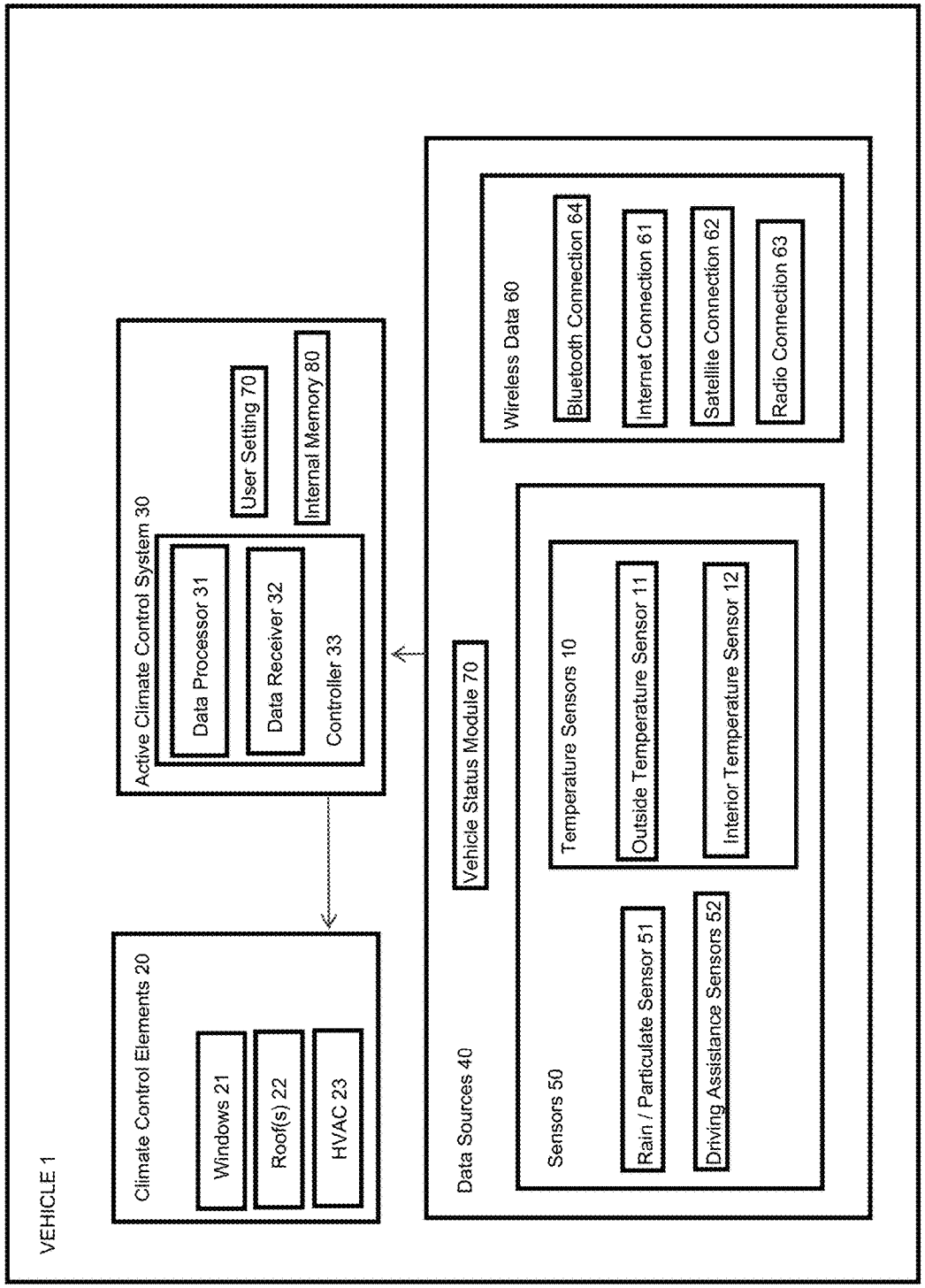
FIG. 2 is a diagram of a vehicle system with an active climate control system.

FIG. 2 illustrates a simplified diagram of the vehicle 1 with the active control system 30. The active climate control system comprises of a controller 33 having a data processor 31 and data receiver 32. In the exemplary embodiment shown both the data receiver 32 and processor 31 are separate units in communication with each other, however it is possible to combine both units into a single unit to process and receive data from the internal memory 80 and inputs 40/70. Data receiver may also be omitted, wherein each sensor sends data directly to the processor 31 for the control system to evaluate. Internal memory 80 includes factory default user settings of the active climate control system absent of any inputs from the data sources 40 and also may include modified user settings 70. The user setting 70 may customized by the user via the dashboard, center console, or other user interfaces in the vehicle. The vehicle may also be provided with a separate portable device which directly communicates with the active climate control system such as a remote fob or a cellphone with corresponding software. User setting 70 may include whether active control system 30 is on or off, whether the active control system will operate manually or automatic, whether the active climate control system mode is timed or set at a user specified time, setting a desired temperature ($T_{desired}$), whether HVAC 23 will be used during the active control, how aggressive the HVAC 23 cooling and heating operates, and selectively activate which sensors 50 or wireless data 60 the controller 33 receives signal from. Data source 40 is an input of the climate control system that uses data from various sensors of the vehicle.

The user may input whether the control system 30 is on or off. During the off status, the active climate control system will not process any data and climate control elements 20 will not be controlled by the active climate control system 30. During the on status, the active climate control system may be set to different modes. The user may use a timed mode where the active climate control system is only active for a certain period of time, up to maximum allotted by the power supply for the active control system. The maximum allotted power for the control system is a percentage of the remaining battery power so that the active climate control system does not drain the battery entirely in its operation. The user may use a time set mode, where the active climate control will activate at a certain time. The user may also set the active climate control system to the continuously on status. During the continuous status, the active climate control runs until the interior temperature has reached the desired temperature. The desired temperature ($T_{desired}$) may be set by the user or recommended by a temperature mapping from the internal memory. The temperature mapping is a function based on $T_{int}$ and/or $T_{out}$. For example, when the $T_{int}$ and $T_{out}$ is extremely high (or low), the temperature mapping would suggest a low (or high) $T_{desired}$ to allow faster and more aggressive cooling (or heating) so occupants of the vehicle would be comfortable once they have entered the vehicle. Depending on the temperature discrepancies between $T_{int}$ and $T_{desired}$ the temperature mapping by the active climate control may automatically control the aggressiveness of the HVAC in both heating and cooling modes. The temperature mapping may be modified to the user's preference. The user may also manual select the aggressiveness of the cooling to $T_{desired}$ manually. The aggressiveness may include the fan speed, and whether or not the air conditioning compressor is turned on. The user may also have further control in the active climate control system by selectively activating which sensors 50 or wireless data 60 the controller 33 receives signal from. Note that in all modes when the HVAC is utilized, climate control elements (windows, roof, and other apertures) may be closed to allow efficient cooling or heating of the vehicle. Climate control elements may be open when atmospheric conditions are present that permit the cooling or heating of the interior to be achieved even when the HVAC system is turned off.

Data sources 40 contain sensors 50 which may be disposed on various locations of the vehicle. Rain sensor and particulate sensor 53 may also be disposed on the vehicle and be of an optical type sensor. Driving sensors 52 may include driving assistance sensors located around the vehicle such as LIDAR, radar, and ultrasonic sensors. Driving assistance sensors detect objects within proximity of the vehicle that aid in functions such as parking, autonomous driving functions (e.g. lane keep assist, active cruise control). Temperature sensors 10 include an outside temperature sensor 11 and an interior temperature sensor 12. Interior temperature sensor 12 detect the temperature inside the passenger compartment of the vehicle. The outside temperature sensor 11 detects ambient outside air temperature.

Data sources 40 may also contain a vehicle status module 70 which sends the operational status of the vehicle or its accessories to the controller via a vehicle telemetry system (e.g., CAN bus). The vehicle status module sends data to the controller 33 to monitor the HVAC status so that the active climate control system 30 may close the climate control elements (windows, roof, and other apertures) of the vehicle when HVAC is on, or to enable the opening of the climate control elements when HVAC is off. The vehicle status module 70 may also send data to the active climate control system 30 to monitor whether the vehicle ignition has been pressed to close the climate control elements of the vehicle. Other events may trigger the closure of the climate control elements such as engagement of the vehicle seatbelt, a registration that a driver has entered the vehicle by monitoring the location of the key fob or mobile phone, that a driver is seated via an occupancy sensor, or monitoring vehicle elements such as the opening of the trunk or hood, opening of a door of the vehicle, or if a movement command was given to the vehicle via the key fob or smart phone.

Wireless data 60 comprise of different communication methods, that can send data signals to the data receiver 32 of the active climate control system 30. The methods of wireless data may include Bluetooth connection 64, Internet connection 61, Satellite connection 62, and radio connection 63. Bluetooth connection 64 may communicate with a mobile device such as a cellphone. The mobile device may include software that controls the active climate control system. The mobile device allows the user to control all of the settings of the active climate control system 30 remotely without being inside the vehicle. A remote fob may also be utilized that uses radio connection 63. The remote fob may also be part of the main key fob for the vehicle. An internet connection 61 may also be utilized by the data receiver. Internet connection 61 may include communication to weather data, pollen forecasts, pollution forecasts. Weather data may include forecasts to allow the active climate control system 30 to anticipate precipitation and potential high winds which may damage the interior of the vehicle or personal items when climate control elements are open. The manufacturer of the vehicle may also provide a service to the user that communicates with the satellite connection 62 of the vehicle. The satellite service may be utilized via a mobile device with configurable settings for the active climate control system 30. The satellite service may be subscription based.

Figure 3:
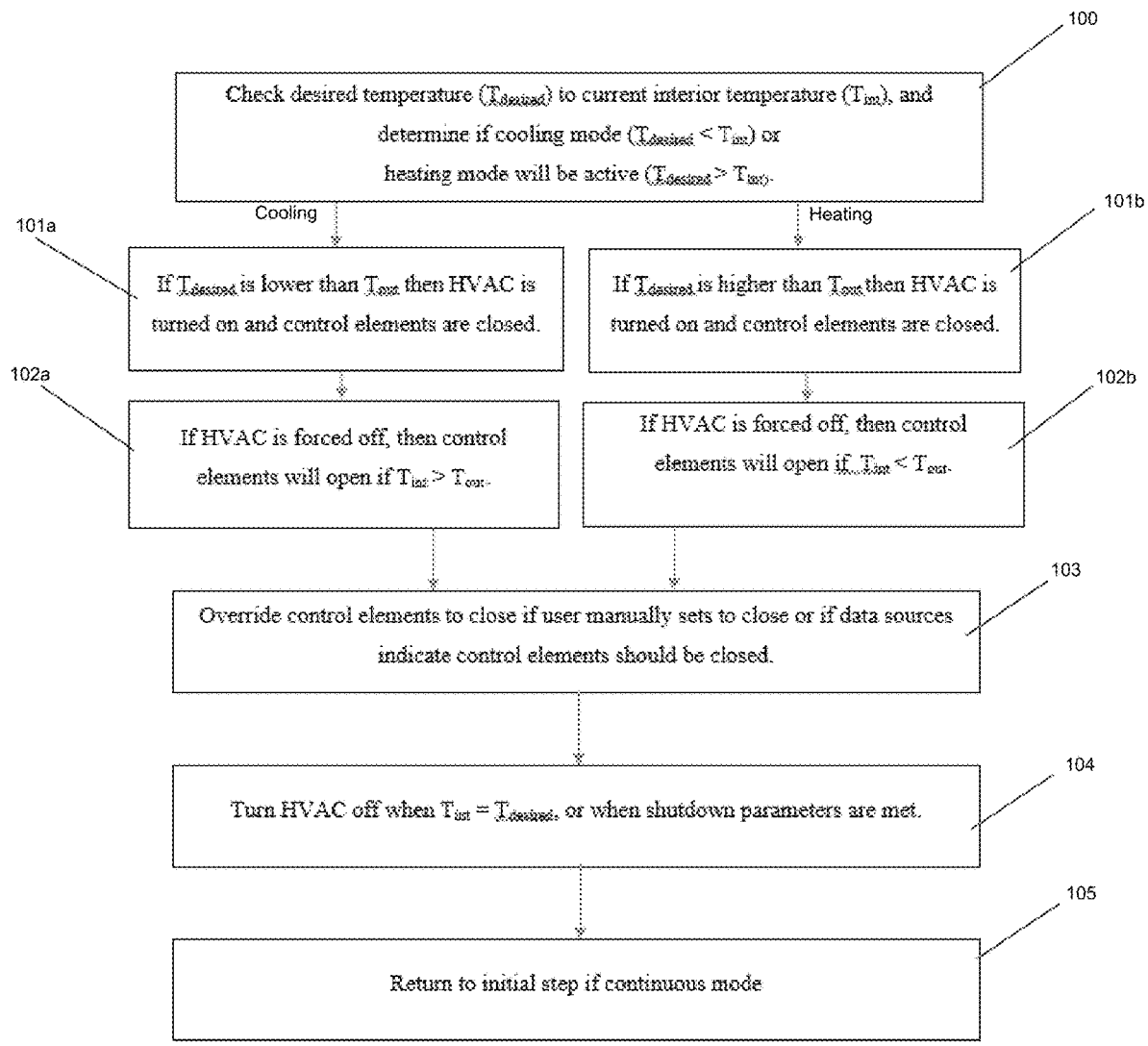
FIG. 3 is an exemplary algorithm of a vehicle system with an active climate control system.

FIG. 3 illustrates an exemplary steps in which the active climate control system 30 would operate when active climate control status is set on by the user in a continuous mode. During step 100, the active climate control system 10 will check for a desired temperature $T_{desired}$ to the current interior temperature $T_{int}$. The user may use the recommended $T_{desired}$ set by the default temperature mapping of the active climate control system 30, or manually set a preferred temperature. $T_{desired}$ may be limited to practical ranges to avoid damage when user has put a large or lower number by error but $T_{desired}$ temperature ranges may be limited to the HVAC capabilities of the vehicle. If $T_{desired}$ does not equal to $T_{int}$ then the active climate control will determine whether to enter cooling or heating mode at step 100. At steps 102a and 102b the user may also turn off the HVAC if the outside temperature $T_{out}$ is lower than $T_{int}$ in the cooling mode, or if $T_{out}$ is higher than $T_{int}$ in the heating mode to allow climate control elements to open. At the cooling step 102a, if $T_{int}$ is greater than $T_{out}$ then the climate control elements of the vehicle will open. Having the climate control elements open when the outside temperature $T_{out}$ can aid in cooling of the interior of the vehicle. A warning message may be sent to the user interface if conditions desired are not possible. For example, in the case where the user has set HVAC off at steps cooling steps 101a/102a and $T_{desired}$ is lower than $T_{out}$ then a warning message showing that $T_{desired}$ is not possible without HVAC turned on. Similarly, for heating steps 101b/102b, if $T_{desired}$ is higher than $T_{out}$ with HVAC off then a warning message will display.

In step 103 the active control system may include triggers that will close the climate control elements of the vehicle when the HVAC is off. The active control system may close windows and roof(s) of the vehicle when the rain sensor communicates the presence of rain. Driving assistance sensors may also trigger the closure of the windows and roof(s) of the vehicle. The driving assistance sensors may be used to trigger the closing of the climate control elements. The sensors may monitor local movement in the geographical proximity to the vehicle. The monitoring of local movement includes sensing approaching personnel within a certain area, which would trigger the active climate control system to close the windows and roof(s) to deter theft. In addition, the active climate control may trigger the vehicle to lock doors. A registered user of the vehicle may bypass the trigger for the active climate control system. A registered user may be a driver with the vehicle key fob located proximate to the driver. This would notify the active climate control system that the driver is a registered user. Image sensors may also be utilized to register users such as repeat passengers of the vehicle. The vehicle may use facial recognition to register repeat passengers to allow approach of the vehicle without triggering the active climate control system to close the windows, roof(s) and lock doors of the vehicle.

Step 103 may also include a trigger to close the windows and roof(s) of the vehicle via the satellite, radio, or internet connection. Weather data may be taken and sent to the data receiver so that a precipitation forecast or severe weather forecast would prompt the active climate control system to close the windows and roof(s). The sensitivity to this forecast may be set by the user (i.e. setting precipitation chance thresholds required to close the windows and roof(s) of the vehicle).

During a timed mode of the active climate control the user sets a timed duration in which the climate control elements to close. In step 103 the active climate control will check for this duration and climate control elements when the active climate control duration has passed. The user may also set certain times of the day in which the active climate control will open the climate control elements. The times set by the user may also be a reoccurring schedule for the active control system. The user may also set a period where HVAC may be turned on at a certain time or for an elapsed amount of time. HVAC may be turned off when desired temperature is reached at step 104. The system may then repeat step 100 to maintain the desired temperature during the continuous mode. If the user has set the HVAC setting off, the system will check less frequently to avoid repeat opening and closing of the climate control elements of the vehicle.

The user of the vehicle may selectively control which data sources the controller 33 receives. Thus the active climate control system may be tailored to the user's preference. Additionally, any of the control schemes described above may also be applied to any of the active climate control elements, such as apertures located in the HVAC system that allow communication with the outside air.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the active climate control system is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An active climate control system for a vehicle comprising:
   an HVAC system including a cooling mode having an on position and an off position;
   at least one climate control element configured to be transitioned between an open position and a closed position;
   a plurality of data sources comprising a passenger compartment temperature sensor and a driving assistance sensor, the passenger compartment temperature sensor disposed within a passenger compartment of the vehicle; and
   a controller in communication with the HVAC system, the at least one climate control element, and the plurality of data sources, the controller configured to, while a driver of the vehicle is located within the passenger compartment of the vehicle:
      receive, from the passenger compartment temperature sensor, a passenger compartment temperature ($T_{int}$);
      determine that the $T_{int}$ is greater than a desired temperature ($T_{desired}$);
      determine that the cooling mode of the HVAC system is in the off position;
      based on determining that the $T_{int}$ is greater than the $T_{desired}$ and that the cooling mode of the HVAC system is in the off position, operate the at least one climate control element in the open position;
      receive, from the driving assistance sensor, data indicating that a person is detected within a predetermined geographical proximity surrounding the vehicle; and
      based on the data indicating that the person is detected within the predetermined geographical proximity surrounding the vehicle and when the $T_{int}$ is greater than the $T_{desired}$:
      lock doors of the vehicle;
      actuate the at least one climate control element to transition from the open position to the closed position; and
      operate the cooling mode of the HVAC system in the on position until the $T_{int}$ is equal to the $T_{desired}$.

2. The active climate control system of claim 1, wherein the plurality of data sources further comprises a vehicle status module.

3. The active climate control system of claim 1, wherein the plurality of data sources transmits data to the controller via a wireless transmission system.

4. The active climate control system of claim 1, wherein the plurality of data sources further comprises an ambient temperature sensor configured to detect an ambient air temperature surrounding the vehicle.

5. The active climate control system of claim 4, wherein the controller is further configured to:
   receive, from the ambient temperature sensor, the ambient air temperature surrounding the vehicle; and
   determine that the ambient air temperature surrounding the vehicle is less than the $T_{int}$,
   wherein, when the $T_{int}$ is greater than the $T_{desired}$, the controller operating the at least one control element in the open position is further based on determining that the ambient air temperature surrounding the vehicle is less than the $T_{int}$.

6. The active climate control system of claim 1, wherein the plurality of data sources transmits data to the controller via a vehicle telemetry system.

7. The active climate control system of claim 1, wherein the controller is further configured to, while the driver of the vehicle is located within the passenger compartment of the vehicle:
   identify that the person detected within the predetermined geographical proximity surrounding the vehicle is not a registered user of the vehicle,
   wherein the control is configured to actuate the at least one climate control element of the plurality of climate control elements to transition from the open position to the closed position based on identifying that the person detected within the predetermined geographical proximity surrounding the vehicle is not the registered user of the vehicle.

8. A vehicle comprising:
an HVAC system including a cooling mode having an on position and an off position;
at least one climate control element configured to be transitioned between an open position and a closed position;
a plurality of data sources comprising a passenger compartment temperature sensor and a driving assistance sensor, the passenger compartment temperature sensor disposed within a passenger compartment of the vehicle; and
a controller in communication with the HVAC system, the at least one climate control element, and the plurality of data sources, the controller configured to, while a driver of the vehicle is located within the passenger compartment of the vehicle:
receive, from the passenger compartment temperature sensor, a passenger compartment temperature ($T_{int}$);
determine that the $T_{int}$ is greater than a desired temperature ($T_{desired}$);
based on determining that the $T_{int}$ is greater than the $T_{desired}$ and that the cooling mode of the HVAC system is in the off position, operate the least one climate control element in the open position;
receive, from the driving assistance sensor, data indicating that a person is detected within a predetermined geographical proximity surrounding the vehicle; and
based on the data indicating that the person is detected within the predetermined geographical proximity surrounding the vehicle and when the $T_{int}$ is greater than the $T_{desired}$:
actuate the at least one climate control element to transition from the open position to the closed position; and
operate the cooling mode of the HVAC system in the on position until the $T_{int}$ is equal to the $T_{desired}$.

9. The vehicle of claim 8, wherein the plurality of data sources further comprises a vehicle status module.

10. The vehicle of claim 8, wherein the plurality of data sources further comprises a weather forecast received from a wireless source.

11. The vehicle of claim 8, wherein the plurality of data sources transmits data to the controller via a vehicle telemetry system.

12. The vehicle of claim 8, wherein the controller is further configured to, while the driver of the vehicle is located within the passenger compartment of the vehicle:
identify that the person detected within the predetermined geographical proximity surrounding the vehicle is not a registered user of the vehicle,
wherein the control is configured to actuate the at least one climate control element of the plurality of climate control elements to transition from the open position to the closed position based on identifying that the person detected within the predetermined geographical proximity surrounding the vehicle is not the registered user of the vehicle.

13. A vehicle comprising:
a passenger compartment;
a plurality of climate control elements comprising a retractable glass aperture and an auxiliary aperture configured for ambient air to enter the passenger compartment of the vehicle, wherein each climate control element of the plurality of climate control elements is configured to transition between an open position and a closed position;
a HVAC system including a cooling mode having an on position and an off position;
a plurality of data sources comprising a passenger compartment temperature sensor and a driving assistance sensor, the passenger compartment temperature sensor disposed within the passenger compartment of the vehicle;
a controller in communication with the HVAC system, the plurality of climate control elements, and the plurality of data sources, the controller configured to, while a driver of the vehicle is located within the passenger compartment of the vehicle:
receive, from the passenger compartment temperature sensor, a passenger compartment temperature ($T_{int}$);
determine that the $T_{int}$ is greater than a desired temperature ($T_{desired}$);
based on determining that the $T_{int}$ is greater than the $T_{desired}$ and that the cooling mode of the HVAC system is in the off position, operate at least one climate control element of the plurality of climate control elements in the open position;
receive, from the driving assistance sensor, data indicating that a person is detected within a predetermined geographical proximity surrounding the vehicle; and
based on data indicating that the person is detected within the predetermined geographical proximity surrounding the vehicle and when the $T_{int}$ is greater than the $T_{desired}$:
actuate the at least one climate control element of the plurality of climate control elements to transition from the open position to the closed position; and
operate the cooling mode of the HVAC system in the on position until $T_{int}$ is equal to the T desired.

14. The vehicle of claim 8, wherein the plurality of data sources further comprises an ambient temperature sensor configured to detect an ambient air temperature surrounding the vehicle.

15. The vehicle of claim 14, wherein the controller is further configured to:
receive, from the ambient temperature sensor, the ambient air temperature surrounding the vehicle; and
determine that the ambient air temperature surrounding the vehicle is less than the $T_{int}$,
wherein, when the $T_{int}$ is greater than the $T_{desired}$, the controller operating the at least one control element in the open position is further based on determining that the ambient air temperature surrounding the vehicle is less than the $T_{int}$.

16. The vehicle of claim 13, wherein the controller is further configured to, while the driver of the vehicle is located within the passenger compartment of the vehicle:
identify that the person detected within the predetermined geographical proximity surrounding the vehicle is not a registered user of the vehicle,
wherein the control is configured to actuate the at least one climate control element of the plurality of climate control elements to transition from the open position to the closed position based on identifying that the person detected within the predetermined geographical proximity surrounding the vehicle is not the registered user of the vehicle.

* * * * *